Figures 1, 2:
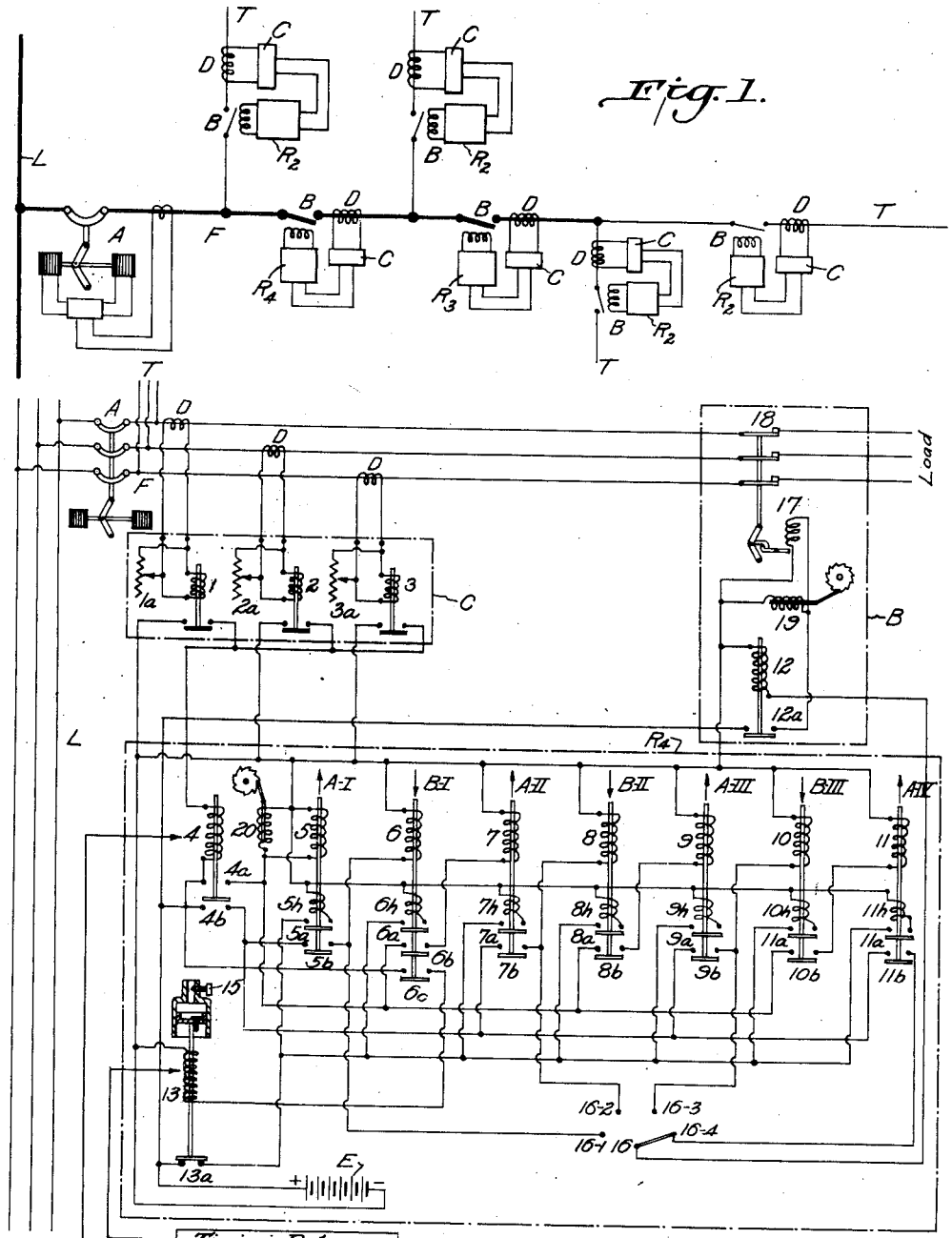

March 26, 1935.　　　　S. H. KAST　　　　1,995,678
PROTECTIVE SYSTEM
Filed July 20, 1932

Inventor:
Samuel H. Kast,
By Byrnes Townsend & Potter,
Attorneys.

Patented Mar. 26, 1935

1,995,678

UNITED STATES PATENT OFFICE 1,995,678

PROTECTIVE SYSTEM

Samuel H. Kast, Greensburg, Pa., assignor to Railway and Industrial Engineering Company, Greensburg, Pa., a corporation of Pennsylvania Application July 20, 1932, Serial No. 623,680

35 Claims. (Cl. 175—294)

This invention relates to protective systems for an electrical power distribution network, and particularly to a system operative, upon the occurrence of a fault upon one section of the network, to isolate the defective section from the remainder of the network.

Power distribution systems usually include main lines which supply current, either directly or through substations, to feeder lines into each of which a plurality of tap lines are connected, and the lines to the consumers are connected to the tap line. The simplest method of isolating a defective tap or a part of a feeder line is to provide overload switches operative to isolate a defective part of the distribution network as soon as a fault occurs. The objection to this known method of protecting a network is that the tap line or feeder section affected by the disturbance is automatically cut off regardless of the nature of the disturbance.

It is well known that the majority, or approximately 80% of line disturbances, disappear with the first interruption of the circuit. The manual restoration of service on the isolated line section may involve some little delay and it is not desirable to isolate a part of the network unless it becomes certain that the disturbance is not transient. To prevent a relatively long interruption of service in the case of transient disturbances, it has been proposed to employ "notching relays" for closing a circuit a predetermined number of times when it is opened by an overload. According to one system, an electrically operated breaker opens automatically on overload and, at predetermined time intervals, closes one or more times in an attempt to restore service on a faulty line. If the disturbance persists, the faulty section is permanently opened by a subsequent operation of the switch. According to another system, the disconnecting switch remains closed during a predetermined number of closures of an oil break overload switch, and the disconnecting switch opens under no load if the oil break switch operates a number, for example three, times. By setting the notching relays of remote sections of the system for a less number of repetitions than those of the feeders or main subdivisions of the system, the faulty section will be isolated from the sections which are free from disturbances.

An object of the present invention is to provide a sectionalizing system, including progressively actuated relays, for protecting a distribution system. An object is to provide a protective system in which the mechanical control of the known notching relay systems is replaced by an electrical control, which electrical control includes a plurality of relays for each section or subdivision of the network, and a time-delay circuit for resetting all of the relays of a section after a definite time interval, the resetting being accomplished whether or not the particular section has been isolated. Further objects are to provide a relatively simple and inexpensive relay system for the protection of each section of a power network, and to provide a protective system in which the operating characteristics of the protective relays for each section may be quickly adjusted. More specifically, an object is to provide a protective system in which a single overload circuit breaker, of the type closed manually or automatically, is provided for a group of line sections, and each section of the group includes a disconnecting switch, and a plurality of relays which are progressively actuated by repeated operations of the circuit breaker, the air break switch being opened under no load after the actuation of a predetermined number of said relays.

These and other objects and advantages of the invention will be apparent from the accompanying drawing in which, Fig. 1 is a schematic diagram of a plurality of sections of a network including a protective system such as contemplated by the invention, and Fig. 2 is a circuit diagram of the relay system for one section of the network.

In the drawing, the reference character L identifies a main line to which a plurality of feeder lines F are connected, the feeder lines being tapped into by or branching into a plurality of tap lines T which feed the consumers' circuits. Each feeder line is provided with an overload circuit breaker A of known type which is reclosed manually or automatically when the circuit breaker opens under an overload. Sections of the feeder lines F and each tap line T include a switch B, preferably of the air break type, which is controlled by a relay system that, in turn, is actuated by relays C which are energized by current transformers D.

According to this invention, the several relay systems interposed between the initial relays C and the switches B are designed to actuate the switches B after a predetermined number of operations of the overload circuit breaker A. As indicated by the subscripts, the relay systems $R_2$ of each tap circuit are designed to effect an opening of their respective circuits upon the second opening of the circuit breaker A, and the relay systems $R_3$, $R_4$ of the sections of a feeder F are designed to open at three and at four, respectively, openings of the circuit breaker. In such a system, each tap circuit is opened if the fault on it persists for a period corresponding to two openings of the circuit breaker, but the outer section of the feeder F is opened on the third opening of the circuit breaker and the feeder line section adjacent the main line L is opened only upon the fourth opening of the circuit breaker. These figures are given only for purposes of illustration as it will be apparent that the relay systems R may be designed or adjusted to open their respective air break switches after any predetermined number of operations of the circuit breaker.

The sectionalizing relay circuits which are shown diagrammatically in Fig. 2 include adjustable elements for determining the number of openings of the circuit breaker which must precede the opening of the section disconnect switch. The particular arrangement there shown may be set to open the line at from one to four operations. Such a sectionalizing relay could therefore be employed for the control of any one of the tap or feeder sections of the Fig. 1 network.

From its adjustment for opening the section on the fourth overload, the relay system as shown in Fig. 2 is of the type identified as $R_4$ in Fig. 1, and it is located in a feeder F at a point adjacent the main line L.

The circuit breaker A is of the manual or automatic reclosing type and may be of any of the known designs now in use. For uniformity with the schematic diagram of Fig. 1, the several electrical units which make up the control relay unit C, the relay system $R_4$ and the disconnect switch B of Fig. 1 are located in broken line rectangles identified by those reference characters. This diagrammatic showing does not indicate the relative physical arrangement of the several electrical units and, preferably, the units for each controlled section of the distribution line (with the exception of the current transformers and the disconnect switch) are mounted on a single panel.

The control relay unit C comprises three overload relays 1, 2 and 3 which are connected, respectively, to the three lines of the feeder F by current transformers D. The windings of the relays are preferably shunted by adjustable resistances $1a$, $2a$ and $3a$, respectively, which may be set for operation of the relays at a desired percentage, say from 50 to 200%, of the normal full load line current. The single pole switches controlled by these relays are normally open and, when the line current rises above a predetermined value, the switches move to closed position and energize the first or impulsing relay 4 of the relay unit $R_4$ by completing a circuit through the operating winding of that relay and a battery E.

The relay 4 transmits successive current impulses to and controls a series of successively actuated relays, 5 to 11, inclusive, of the relay unit $R_4$ and the progressive actuation of this series energizes the relay 12 which in turn sets in operation the tripping mechanism 17 of the disconnect switch 18 if four overloads occur within a period determined by the setting of a time delay relay 13 of the unit $R_4$. The relay 13 operates to restore the sequence relay system to its original condition after one or more openings of the circuit breaker and, preferably, the time delay between the first opening of the circuit breaker and the resetting may be adjusted by a control 15. The illustration of the time delay relay 13 and the control 15 is to be understood as schematic of any adjustable time delay means, as any of the known electrical, mechanical or pneumatic arangements may be employed. A four point switch 16 is provided for controlling the number of the sequence relays, 5 to 11, which must be actuated to energize the relay 12. A closing of the circuit of relay 12 connects the trip winding 17 of the spring disconnect switch 18 across the battery E, thereby opening the feeder line and isolating the section from the remainder of the distribution network.

The relay 4 also acts as a timing device, as its operating time is so chosen or adjusted that it will not complete its closing movement if the overload current surge is but momentary. The switch actuated by the relay 4 is, in effect, a single pole, double throw switch having contacts $4a$, $4b$ which are alternately closed by the actuation of one or more of the control relays 1, 2, 3 and by the opening of the branch line by the circuit breaker A. The relative time-response characteristics of the several relays and of the circuit breaker A are such that the relay 4 closes before the circuit breaker A opens and, in the event of a continuing overload, the circuit breaker A preferably opens before the disconnect switch 18 opens.

The function of the relay 4 is that of progressively actuating the sequence relays 5 to 11 by the repeated and alternate closings of the switches $4a$, $4b$. Each sequence relay is provided with a holding winding, $5h$, $6h$, etc., in addition to the main or operating winding, and the holding circuits are completed through the switch $13a$ of the time delay or resetting relay 13. One terminal of the operating and holding windings of each sequence relay is connected to the negative side of the battery E; the normally closed contacts $4b$ of relay 4 connect the positive side of the battery to one terminal of each of the switches $5b$, $7b$, $9b$ and $11b$ of the sequence relays 5, 7, 9 and 11; and the normally open contact $4a$ of the relay 4 is connected to the operating winding of relay 5 and to one terminal of each of the contacts $6b$, $8b$ and $10b$ of relays 6, 8 and 10. The controlled terminals of the operating windings of sequence relays 6 to 11 are connected to one side of the switches $5a$, $6a$, etc. of the preceding relay.

The contacts $5a$, $6a$, etc., of each sequence relay control circuits from the normally open terminal of the respective holding windings to the switch $13a$ of the resetting relay 13. The relay 6 has a third contact or switch $6c$ for energizing the time delay or resetting relay 13 upon the first opening of the relay 4.

As will be apparent from the following description of operation, the several relays 5 to 11 constitute what may be termed a chain of accumulating sequentially-energized relays. Each relay of the chain includes means, such as the holding coil, for retaining the relay in actuated position when it is moved to such position by an energizing current impulse, and each relay closes a switch to permit a succeeding current impulse to pass to the next relay in the chain to actuate the same. Current impulses are supplied to the relay chain by the alternate energizing and deenergizing of the relay 4, and the relay chain thus accumulates or counts the number of impulses, but the chain is deenergized when the holding means are released by the timing device 13 or, the release of the holding means of any one relay prevents further accumulation of effects or counting since it is then impossible to energize a succeeding relay by a subsequent current impulse.

In the case of an overload due to any cause, the sequence of operations is as follows. One or more of the control relays 1, 2 and 3 operate to complete the battery circuit to relay 4, thus closing switch 4a. This completes the battery circuit to the operating winding of relay 5, thus closing switches 5a and 5b. Switch 5a completes the battery circuit through the holding winding 5h and time delay switch 13a, but the closing of switch 5b does not complete the battery circuit to the operating winding of relay 6, since the switch 4b is open.

If the disturbance continues, the circuit breaker A opens thus deenergizing the control relays 1, 2 and 3, and thereby opening the circuit of relay 4. The relay 4 drops to normal position closing switch 4b but the relay 5 remains closed due to current flow through the holding winding 5h. Switches 4b and 5b thus complete the battery circuit through the main winding of relay 6 and the three switches of that relay are thus closed by the first opening of the relay 4. The arrows above the relays 5 and 6 and their accompanying reference characters A—I and B—I, respectively, indicate the direction of the movement of the timing relay 4 that energizes the respective relays, the reference character A—I indicating that relay 5 was energized by the first closing movement of relay 4, and the character B—I indicating that the relay 6 was energized by the first opening movement of the relay 4.

The closing of the contacts of the relay 6 completes the holding circuit of that relay through contacts 6a and completes the battery circuit through the time-delay relay 13 through the contact 6c. The contact 6b connects the positive terminal of the operating winding of relay 7 to the switch 4a of the relay 4, which switch 4a is then open.

Assuming that the disturbance still exists, the automatic or manual reclosing of the circuit breaker A will result in a second energizing of one or more of the control relays 1, 2 and 3, and the closing of any one of these relays effects a second energization of the relay 4 to reclose the contacts 4a. This completes the battery circuit through the main winding of the relay 7 and its armature moves to close the contacts 7a and 7b. This energizing of the relay 7 at the second closing of the relay 4 is indicated by the arrow A—II. When the relay 4 is deenergized, either by the removal of the fault or the second opening of the circuit breaker A, the relay 8 is energized, as indicated by the arrow B—II. If the fault is still on the line when the circuit breaker A recloses for the second time, the relay 4 is again energized to effect a closing movement of the contacts of relay 9, as indicated by the arrow A—III, and is then deenergized to energize the relay 10, as indicated by the arrow B—III. If the circuit breaker A is reclosed for the third time on a faulty line, the energizing of the relay 4 will effect the closing, indicated by arrow A—IV, of the relay 11. When this occurs, the contact 11b completes the battery circuit through the point switch 16 and the relay 12 and the resulting closing of the switch 12a of that relay connects the trip winding 17 across the battery E and opens the switch 18 to isolate the faulty section of the system. As stated above, the relative operating times of the several elements may be, and preferably are, so chosen that the disconnect switch 18 opens under no load.

The operating winding 19 of a counter is preferably connected across the trip winding 17 to provide a record of the number of operations of the disconnect switch and a similar counter 20 may be connected across the main winding of the relay 5 to provide a record of the number of overload impulses.

Reviewing the sequence of operations, it will be seen that the line switch 18 tripped open on the fourth overload by the progressive actuation of the sequence relays 5 to 11, inclusive. A lesser number of overloads could not open the switch 18, since the contact arm of the point switch 16 was set on the contact 16—4 that is connected to the switch 11b of relay 11. It will be apparent that the switch 16 is not necessary in a relay system intended to open the line only at the fourth overload. The switch 16 is preferably provided, however, to afford a control of the number of overload impulses that will open the line. As shown in Fig. 2, the contact 16—1 leads to the contact 5b of relay 5, and the switch 18 will open at the first overload if the contact arm of switch 16 is set on the contact 16—1. Similarly, the contacts 16—2, 16—3 are connected to the switches 7b and 9b, respectively, of relays 7 and 9. The switch 16 may therefore be positioned to effect an opening of the switch 18 at any desired number, up to 4, of overload impulses. Additional pairs of sequence relays may be provided to increase the number of overloads required for an opening of the line and, for a control based on less than four overload impulses, some of the sequence relays may be omitted. Reverting to the schematic diagram of Fig. 1, it will be understood that the sequence relays $R_2$ and $R_3$ preferably include the same elements as the $R_4$ relay shown in Fig. 2, but that the point switch 16 of the $R_2$ relay will set at contact 16—2 and the switch arm 16 of relay $R_3$ will be set at contact 16—3. If the fault is on a tap line, only two overloads can occur, since the faulty tap will be isolated upon the second overload.

Whether the entire sequence of operations takes place to open the line, or the fault is removed before the sequence is completed, each relay system is reset to its original position by the opening, after a predetermined time interval, of the switch 13a through which the battery current flows to the holding coils of relays 5 to 11, inclusive. As indicated schematically by the switch 15, some means is preferably provided for adjusting the time interval between the energizing of the relay 13, at the first opening of the relay 4, and the opening of the delay switch 13a, the delay period being such that the holding circuits are deenergized immediately after the lapse of that time which is required for the complete sequence of operations of the particular sequence relay.

The equipment at any one sectionalizing point is comparatively simple and inexpensive. As the disconnect switch opens under no load, it may be of a relatively simple design. Although a number of relays are required, these parts are of small size and may be of the type commonly employed in telephone work. The entire assembly of relays shown in Fig. 2, together with switches 15, 16 and the adjustable resistances of the relays 1, 2 and 3, may be mounted on a control panel of less than two square feet. To provide for flexibility of control, it is preferable to make each sectionalizing relay system of the form shown in Fig. 2 even for those points in the network at which the circuit is to be opened upon the second or the third overload. The cost of the additional sequence relays which are cut out by and adjustment of the switch 16 to one of the intermediate contact points is relatively small and is more than balanced by the ability to effect a practically instantaneous change in the operating characteristics of each protective relay system. Some of the advantages of an electrical control over the mechanical control of the known notching relay systems are relatively low cost, positive operation, ease of inspection and repair or replacement, rapidity of adjustment to different operating conditions, and the small size and compact location on a small panel.

The specific structural details of the component parts of the sectionalizing system have not been illustrated since all parts are or may be standard equipment, and the invention is based upon the combination of electrical circuit elements, each of which may be of known construction, and not in the particular design of any one element.

I claim:

1. In an electrical power system, the combination with a feeder line and tap lines branching therefrom, a circuit breaker in said feeder line operable automatically to open position in the event of an overload on the same or on said tap lines, of an overload control relay in each of said tap lines, a disconnect switch in each tap line, and relay means between said overload relay and said switch, said relay means including a plurality of sequentially-energized relays for determining the number of overloads which will effect operation of said switch.

2. In an electrical power system, the combination with a feeder line and tap lines branching therefrom, a circuit breaker in said feeder line operable automatically to open position in the event of an overload on the same or on said tap lines, of an overload control relay in each of said tap lines, a disconnect switch in each tap line, and relay means between said overload relay and said switch, said relay means including a plurality of electrical circuit elements for determining the number of overloads which will effect operation of said switch.

3. In an electrical power system, the combination with a feeder line and tap lines branching therefrom, a circuit breaker in said feeder line operable automatically to open position in the event of an overload on the same or on said tap lines, of an overload control relay in each of said tap lines, a disconnect switch in each tap line, and relay means between said overload relay and said switch, said relay means including a plurality of progressively actuated relays for determining the number of overloads which will effect operation of said switch.

4. The invention as set forth in claim 2, in combination with means for resetting said relay means to normal condition at a predetermined period of time subsequent to the actuation of said control relay.

5. In an electrical power distribution system, the combination with a distribution line and branch lines fed thereby, and an overload circuit breaker protecting said distribution line, of disconnect switches in said distribution line and in each of said branch lines, and relay means for actuating each of said disconnect switches, said relay means including a plurality of progressively actuated relays and the relay means of said distribution line comprising a greater number of progressively actuated relays than the relay means of each of said branch lines.

6. In an electrical power network, the combination with a distribution line and subordinate lines branching therefrom, and a circuit breaker in said distribution line, of overload relay means in each subordinate line for isolating the same in the event of a fault on the respective branch lines; said overload relay means including a control relay, an impulsing relay, a plurality of sequence relays progressively actuated by the energizing and deenergizing of said impulsing relay, a disconnect switch in said branch line, and means controlled by one of said sequence relays for actuating said disconnect switch.

7. In an electrical power network, the combination with a distribution line and subordinate lines branching therefrom, an overload circuit breaker protecting said distribution line and branches, of automatic means for isolating one of said branch lines from the network when a fault occurs on said branch line, said means including an overload control relay, an impulsing relay energized by said control relay in the event of an overload, a disconnect switch in said branch line, relay means controlled by said impulsing relay for opening said disconnect switch upon a predetermined number of overloads, and time delay means controlled by said impulsing means for resetting said relay means to normal position at a predetermined time interval following the actuation of said impulsing relay.

8. In a protective system, the combination with an electrical power network including a distribution line, a plurality of branch lines fed thereby, and disconnect switches in said distribution line and in each of said branch lines, of automatic means for isolating said distribution line from said network on a predetermined number of overloads and for isolating any one of said branch lines upon a lesser predetermined number of overloads, said automatic means including at each disconnect switch a relay system comprising an impulsing relay and progressively actuated relays for actuating each of said disconnect switches.

9. The invention as set forth in claim 8, in combination with time delay means for resetting each of said automatic means to normal condition at a predetermined time interval following a fault on one of said branch lines.

10. In an electrical power system, the combination with a distribution line, subordinate lines branching therefrom, an overload circuit breaker in said distribution line, a disconnect switch in the distribution line and in each subordinate line, of means at each switch for automatically opening the same in the event of a continuing overload, said means including an overload control relay, an impulsing relay energized by said overload relay and de-energized when the overload circuit breaker opens, a plurality of sequence relays progressively energized by said impulsing relay, and trip mechanism for the disconnect switch, said trip mechanism including a relay circuit controlled by one of said sequence relays.

11. The invention as set forth in claim 10, in combination with a switch for connecting the relay circuit of said trip mechanism to any one of a plurality of said sequence relays, thereby permitting adjustment of the number of cycles of movement of said impulsing relay which will result in an opening of the disconnect switch.

12. The invention as set forth in claim 10, in combination with means for deenergizing all of the sequence relays of each of said automatic opening means at a predetermined time following the first operation of said impulsing relay.

13. The invention as set forth in claim 10, wherein each of said sequence relays includes a main and a holding winding, and each of said sequence relays includes a switch in the circuit of its own holding winding; in combination with a time delay relay including a switch common to the energizing circuits of each of said holding windings, and circuit elements controlled by said timing relay for energizing said impulsing delay relay, whereby all of said holding circuits are deenergized by said time delay relay at a predetermined time following the first movement of said impulsing relay.

14. The invention as set forth in claim 10, wherein a plurality of said automatic opening means include the same number of sequence relays, in combination with means regulating the several automatic opening means to actuate their individual circuit breakers upon the occurrence of a different number of overload impulses.

15. In a protective system, the combination with an electrical power distribution line, a plurality of branch lines fed thereby, an overload circuit breaker in said distribution line, and disconnect switches in said distribution line and in each of said branch lines, of a control system for each of said disconnect switches, each control system comprising an impulsing relay for alternatively closing two switches, a control relay coupled to the line adjacent the particular disconnect switch of the control system, said control relay closing the energizing circuit of said impulsing relay in the event of an overload, and thereafter opening said energizing circuit when the circuit breaker opens, a plurality of sequence relays, circuit connections between said sequence relays and the switches of said impulsing relay to energize the first of said sequence relays when the impulsing relay is first actuated by an overload and to energize progressively one additional sequence relay at each subsequent deenergizing and energizing of the impulsing relay, a trip circuit for the disconnect switch, and a relay in said trip circuit and controlled by one of said sequence relays.

16. In an electrical system, the combination with a feeder circuit subdivided into sections and taps, a circuit breaker for the entire feeder circuit operable to rupture the feeder circuit under load, and a plurality of switches for sectionalizing the several sections of the feeder and for controlling the tap connections to the feeder circuit; of means for opening the circuit breaker under abnormal conditions and for reclosing the breaker to re-energize the feeder circuit, and means associated with the switches for selectively detecting and isolating a faulty feeder section or tap; said detecting and isolating means comprising means at each switch responsive to the circuit condition beyond the switch, means at each switch controlled by the condition-responsive means to count the number of openings and reclosures of the circuit breaker as indicated by the de-energized and re-energized condition of the circuit when the abnormal condition exists, means operative after a predetermined number of counted operations of the circuit breaker for opening the switch of the affected section or tap, and means for resetting the counting means a pre-determined interval after the first reclosure of the circuit breaker.

17. In an electrical system of the character described, an automatic switch unit comprising a switch automatically operable to open position, means comprising a coil for operating the switch to open position, a load-responsive relay adapted to be connected to and energized from the circuit that is to be controlled by the switch, a chain of relays to be actuated sequentially by the load responsive relay in accordance with the number of times the circuit that is to be controlled by the switch is de-energized and re-energized by a remote circuit breaker in response to a faulty condition of the switch circuit, and means controlled by the chain of relays, when a pre-determined number of operations are counted, for energizing the operating coil of the switch to open the switch.

18. In an electrical system of the character described, an automatic switch unit comprising a switch automatically operable to open position, means comprising a coil for operating the switch to open position, a load-responsive relay adapted to be connected to and energized from the circuit that is to be controlled by the switch, a chain of relays to be actuated sequentially by the load-responsive relay in accordance with the number of times the circuit that is to be controlled by the switch is de-energized and re-energized by a remote circuit breaker in response to a faulty condition of the switch circuit, means controlled by the relay chain, when a predetermined number of operations are counted, for energizing the operating coil of the switch to open the switch, and means for resetting the relay chain for a subsequent operation.

19. In an electrical system of the character described, an automatic switch unit comprising a switch automatically operable to open position, means comprising a coil for operating the switch to open position, a load-responsive relay adapted to be connected to and energized from the circuit that is to be controlled by the switch, a chain of relays to be actuated sequentially by the load-responsive relay in accordance with the number of times the circuit that is to be controlled by the switch is de-energized and re-energized by a remote circuit breaker in response to a faulty condition of the switch circuit, means controlled by the relay chain, when a pre-determined number of the relays of said chain have been actuated, for energizing the operating coil of the switch to open the switch, and means initiated by the relay chain for restoring the counting chain to its initial position for a subsequent operation.

20. In an electrical system of the character described, an automatic switch unit comprising a switch automatically operable to open position, means comprising a coil for operating the switch to open position, a load-responsive relay adapted to be connected to and energized from the circuit that is to be controlled by the switch, a chain of relays to be actuated sequentially by the load-responsive relay in accordance with the number of times the circuit that is to be controlled by the switch is de-energized and re-energized by a remote circuit breaker in response to a faulty condition of the switch circuit, means controlled by the relay chain, when a predetermined number of the relays of said chain are actuated, for energizing the operating coil of the switch to open the switch, and means for selectively predetermining the number of actuated relays that shall control the operating coil of the switch.

21. In an electrical system of the character described, the combination with a feeder circuit subdivided into sections and taps, a circuit breaker for rupturing the entire feeder circuit under load upon the occurrence of an abnormal condition therein, and a plurality of switches connecting the several sections and the taps and operable automatically to open position but incapable of rupturing the circuit under load; of means operative upon the occurrence of a fault at any point in the entire feeder circuit for automatically opening and reclosing the circuit breaker to de-energize and to re-energize the entire feeder circuit, and means associated with the switch traversed by the abnormal fault current for counting the number of openings and reclosures of the circuit breaker (as indicated by the lapse and re-establishment of the fault current through said switch) and for automatically opening the switch while the circuit breaker is open, after a predetermined number of operations of the circuit breaker, to isolate the faulty portion of the feeder, said last means including an overload relay, an impulsing relay controlled thereby, and a plurality of relays controlled by said impulsing relay.

22. In an electrical system of the character described, the combination with a feeder circuit subdivided into sections and taps, a circuit breaker for rupturing the entire feeder circuit under load upon the occurrence of an abnormal condition therein, and a plurality of switches connecting the several sections and the taps and operable automatically to open position but incapable of rupturing the circuit under load; of means operative upon the occurrence of a fault at any point in the entire feeder circuit for automatically opening and reclosing the circuit breaker to de-energize and to re-energize the entire feeder circuit, means associated with the switches traversed by the abnormal fault current for counting the number of openings and reclosures of the circuit breaker as indicated by the lapse and the reestablishment of the fault current through such switches, said counting means including a plurality of accumulative and selectively-actuated relays, means associated with each of the counting means for causing the automatic opening of the associated switch after a predetermined number of operations of the respective counting means, adjustable means for predetermining the number of counting operations that a counting means shall perform before operating the associated switch, whereby the counting means associated with a plurality of said switches may be pre-set to function in a predetermined progressive sequence to selectively test several sections of the feeder and isolate a faulty portion of the feeder.

23. A protective system for a feeder circuit, comprising a main circuit breaker for rupturing the feeder circuit under load under abnormal circuit conditions, a plurality of switches for subdividing the feeder circuit into sections and taps, current transformers and relay means to be energized from the circuit adjacent each switch for detecting whether a faulty circuit condition exists beyond the switch, means controlled by said relay means for counting the number of operations of the circuit breaker in response to the faulty condition, said controlled means including an impulsing relay and a plurality of accumulative relays successively actuated by said impulsing relay and means for opening the switch nearest the faulty portion of the feeder circuit after a predetermined number of operations of the circuit breaker within a predetermined time interval.

24. A protective system for a feeder circuit, comprising a main circuit breaker for rupturing the feeder circuit under load under abnormal circuit conditions, a plurality of switches for subdividing the feeder circuit into sections and taps, current transformers and relay means to be energized from the circuit adjacent each switch for detecting whether a faulty circuit condition exists beyond the switch, means controlled by said relay means for counting the number of operations of the circuit breaker in response to the faulty conditions, and means for opening the switch nearest the faulty portion of the feeder circuit after a predetermined number of operations of the circuit breaker within a predetermined time interval, and means for resetting the counting means a predetermined time interval after a selected circuit breaker operation.

25. A switch unit for an electric circuit, comprising a switch having an open and a closed position, a trip coil for controlling its movement to open position, a current-transformer to be energized from the circuit to be controlled, an overload relay responsive thereto, an impulsing relay controlled by the overload relay according to the energized or de-energized condition of the circuit to be controlled, a plurality of relays constituting a counting chain and sequentially energized by the impulsing relay to count the number of times the circuit is de-energized and re-energized from a remote source, means controlled by a predetermined relay of the chain to energize the trip coil of the switch, means controlled by each relay for setting up a circuit to the subsequent relay in the chain to be energized by a subsequent operation of the impulsing relay and for establishing a holding circuit for itself, and means for releasing all of the operated relays to their initial positions for a subsequent control of the switch.

26. A switch unit for an electric circuit, comprising a switch having an open and a closed position, a trip coil for controlling its movement to open position, a current-transformer to be energized from the circuit to be controlled, an overload relay responsive thereto, an impulsing relay controlled by the overload relay according to the energized or deenergized condition of the circuit to be controlled, a plurality of counting relays constituting a counting chain and sequentially energized by the impulsing relay to count the number of times the circuit is de-energized and re-energized from a remote source, means controlled by a predetermined relay of the chain to energize the trip coil of the switch, means controlled by each relay for setting up a circuit to the subsequent relay in the chain to be energized by a subsequent operation of the impulsing relay and for establishing a holding circuit for itself, and a timing relay for resetting the counting relays to their initial positions after the lapse of a predetermined time interval following the operation of a predetermined relay of the counting chain.

27. A switch unit for preventing energization of an electric circuit upon the occurrence of a predetermined number of overload conditions, said unit comprising a switch having an open and a closed position, a chain of accumulative sequentially-actuated relays, an impulsing relay, means operative in response to the recurring overload conditions to actuate said impulsing relay to supply current impulses to said chain of relays to sequentially actuate the same, and means including a circuit controlled by a relay of said chain for opening said switch and retaining the same in open condition.

28. A switch unit as claimed in claim 26, in combination with adjustable switch means for connecting the circuit of said last means with a desired relay of said chain.

29. A relay unit as claimed in claim 26, in combination with means operative to prevent continued sequential actuation of the relays of said chain upon the lapse of a predetermined time after the first overload condition.

30. A switch unit for an electrical circuit comprising a switch to be controlled, means for producing a series of electrical impulses, a plurality of relays sequentially actuated by the successive impulses produced by said impulsing means, each of said relays including holding means for retaining the same in actuated position upon actuation thereof and each relay when in actuated position closing a switch in the energizing circuit by which an impulse is transmitted to the succeeding relay, and means for rendering the holding means of one of said relays inoperative, thereby preventing the actuation of a succeeding relay.

31. A switch unit as claimed in claim 30, wherein said last means comprises a timing device for rendering the holding means of one of said relays inoperative upon the lapse of a predetermined time after the energization of a preceding relay of said plurality of relays.

32. A switch unit for an electrical circuit comprising a switch to be controlled, means for producing a series of electrical impulses, a plurality of relays sequentially actuated by the successive impulses produced by said impulsing means, each of said relays including holding means for retaining the same in actuated position upon actuation thereof and each relay when in actuated position closing a switch in the energizing circuit by which an impulse is transmitted to the succeeding relay, and time-controlled means for rendering inoperative the holding means of at least one of said relays in the event that a predetermined number of impulses are not produced by said impulsing means within a predetermined time.

33. A switch unit for an electrical circuit comprising a switch, load-response relay means adapted to be associated with the circuit, an impulsing relay to be actuated in opposite directions by said relay means in response to overload and no load conditions respectively, a chain of accumulating relays, means including said impulsing relay for sequentially actuating said relay chain, and a circuit controlled by a relay of said chain and including means for actuating the said switch.

34. A switch unit as claimed in claim 33, wherein said load responsive relay means includes a current transformer adapted to be subjected to current flow in said circuit, a relay having a winding connected across said transformer, and switch contacts included in the circuit of said impulsing relay, and an adjustable resistance shunted across said winding, whereby the sensitivity of said relay means to overload currents may be adjusted.

35. A switch unit for an electrical circuit comprising a switch to be actuated upon the occurrence of a plurality of predetermined conditions at successive times and within a predetermined total period of time, a series of relays adapted to be operated successively, the final relay of said series controlling means for actuating said switch, means responsive to the occurrence of said predetermined conditions at successive times for actuating switches in the energization circuits of successive relays of said series, at least one of the relays so actuated by said means closing a switch in the energization circuit of a succeeding relay, whereby the failure of one relay to function due to the non-existence of one predetermined condition prevents energization of a succeeding relay, timing means energized by contacts controlled by the first relay of said series, and means actuated by said timing means for rendering said series of relays inoperative if the last of said predetermined conditions does not occur within a predetermined time interval after the first of said conditions occurs.

SAMUEL H. KAST.